(12) United States Patent
Bendel et al.

(10) Patent No.: US 7,255,392 B2
(45) Date of Patent: Aug. 14, 2007

(54) GUIDE RAIL SYSTEM FOR A MOVEABLE SUNROOF SYSTEM INCLUDING A SUNSHADE AND METHOD OF PRODUCING A GUIDE RAIL SYSTEM FOR A MOVEABLE SUNROOF SYSTEM

(75) Inventors: Andreas Bendel, Wiesbaden (DE); Joachim Roder, Muhlheim (DE); Rainer Grimm, Frankfurt (DE); Horst Bohm, Frankfurt (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/959,594

(22) Filed: Oct. 6, 2004

(65) Prior Publication Data

US 2005/0073177 A1   Apr. 7, 2005

(30) Foreign Application Priority Data

Oct. 6, 2003  (DE) ................................ 103 46 346

(51) Int. Cl.
*B60J 7/00* (2006.01)
(52) U.S. Cl. ............................................. 296/216.08
(58) Field of Classification Search ............ 296/216.08
See application file for complete search history.

(56) References Cited

U.S. PATENT DOCUMENTS

| | | | |
|---|---|---|---|
| 4,175,784 A * | 11/1979 | Schatzler et al. ........... 296/214 |
| 4,811,985 A | 3/1989 | Kruger | |
| 4,946,225 A * | 8/1990 | Jardin ......................... 296/213 |
| 5,149,170 A | 9/1992 | Matsubara | |
| 6,129,413 A * | 10/2000 | Klein .................... 296/220.01 |
| 6,454,346 B1 * | 9/2002 | Nabuurs ................ 296/216.06 |
| 6,880,884 B2 * | 4/2005 | Sugiura ................. 296/216.08 |
| 6,916,064 B2 * | 7/2005 | Bohm et al. .......... 296/216.04 |

FOREIGN PATENT DOCUMENTS

JP            60004418         1/1995

OTHER PUBLICATIONS

European Search Report, dated Jun. 7, 2006.

* cited by examiner

*Primary Examiner*—Dennis H. Pedder
(74) *Attorney, Agent, or Firm*—Carlson, Gaskey & Olds

(57) ABSTRACT

A guiding system for a moveable sunroof system includes at least one first guide rail for a first vehicular component and at least one second guide rail for a second vehicular component. The first and second guide rails are connected with each other and are tailored to their unique load requirements by employing materials having different properties. Further, the guide rails can be modified independently from one another. If, for instance, the geometry of the second guide rail has requires modification, it is not necessary to modify the entire guiding system. Instead, it is sufficient to modify only the second guide rail to the new requirements. Therefore, portions of the guide rail system may easily be replaced.

31 Claims, 4 Drawing Sheets

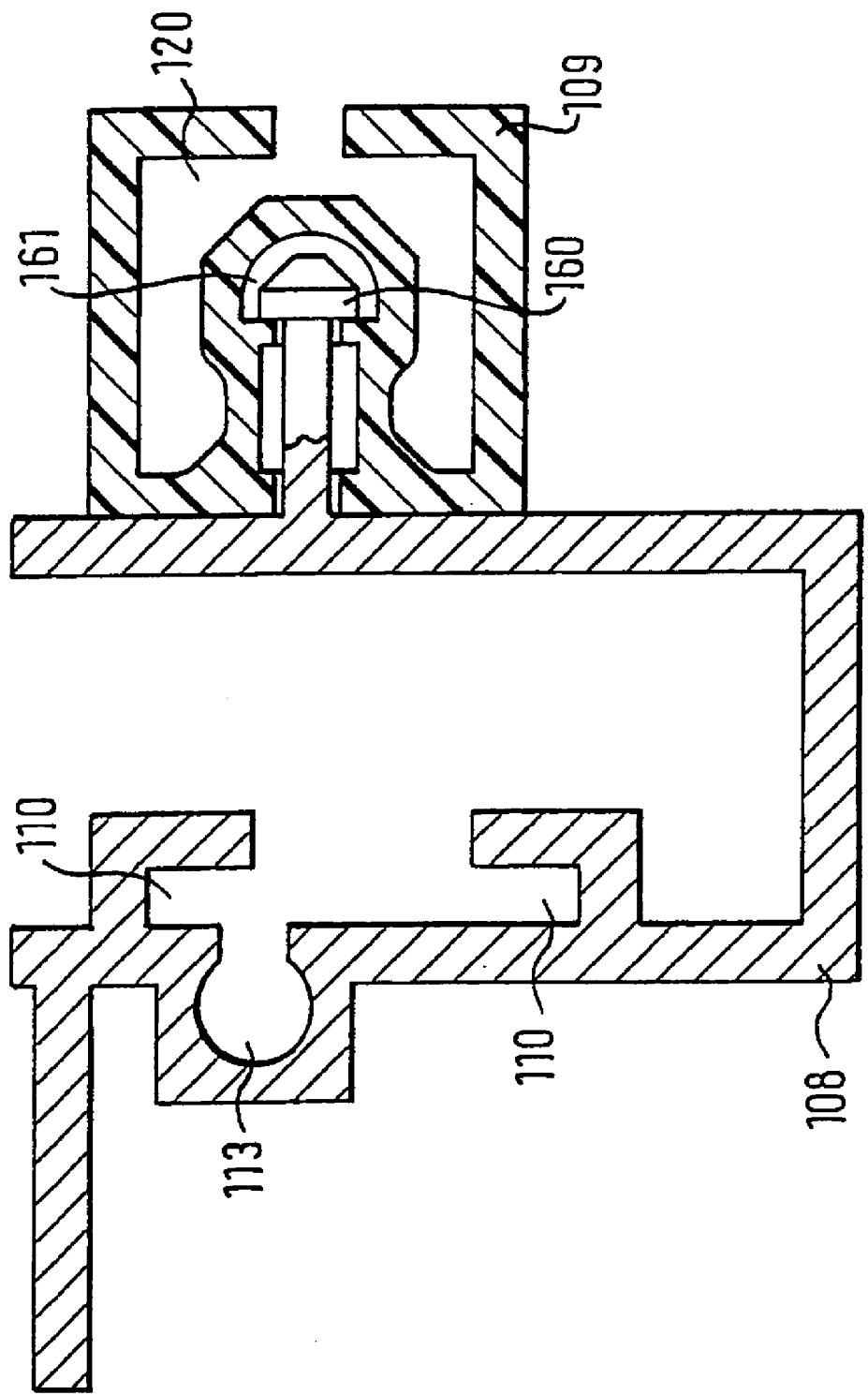

GUIDE RAIL SYSTEM FOR A MOVEABLE SUNROOF SYSTEM INCLUDING A SUNSHADE AND METHOD OF PRODUCING A GUIDE RAIL SYSTEM FOR A MOVEABLE SUNROOF SYSTEM

REFERENCE TO RELATED APPLICATION

This application claims priority to German Patent Application DE 103 46 346.1 filed on Oct. 6, 2003.

BACKGROUND OF THE INVENTION

The present invention relates generally to a guide rail system for movable vehicular components, in particular a moveable sunroof system including a sunshade.

Included with a sliding-tilting sunroof on a motor vehicle are two guide rails fixedly mounted to the motor vehicle at the sides of the roof to guide the moveable sunroof. Portions of the guide rails may also guide another cover, such as an interior roof lining, that is arranged underneath the sunroof and can be separately shifted or may guide further sunshade systems, such as a window blind.

It is the object of this invention to provide a less complex and more cost-effective guiding system which nevertheless has the required technical features. Moreover, a cost-effective method of producing a simple guiding system, fulfilling the technical demands, is disclosed.

SUMMARY OF THE INVENTION

The guide rail system according to one embodiment of the present invention has at least one first guide rail for a first vehicular component and at least one second guide rail for a second vehicular component. The first and second guide rails are connected with each other and are tailored to their unique load requirements by employing materials having different properties. Therefore, portions of the guide rail system may easily be replaced.

Further, the individual guide rails can also be modified independently from one another. If, for instance, the geometry of the second guide rail has to be modified, it is not necessary to modify the entire guiding system. Instead, it is sufficient to modify only the second guide rail to the new requirements.

Additional features and advantages of the invention will be apparent from the following description and the following drawings to which reference is made.

BRIEF DESCRIPTION OF THE DRAWINGS

FIG. 4 is a cross-sectional view through a right-hand guide rail system of the present invention according to a second embodiment.

DETAILED DESCRIPTION OF THE PREFERRED EMBODIMENTS

Figure 1:
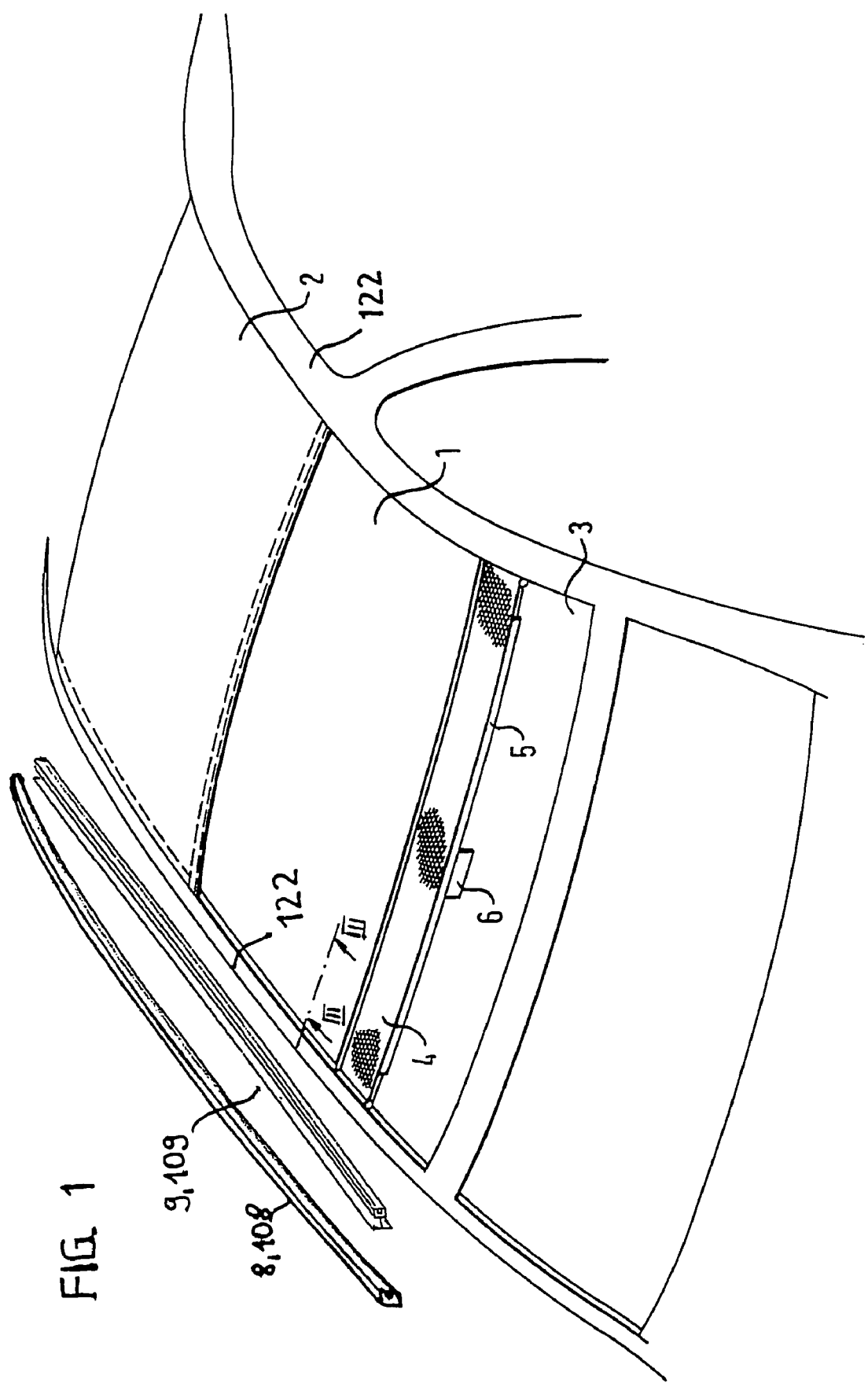
FIG. 1 is a schematic top view of a vehicle with a sliding-tilting sunroof, including a guide rail system according to one embodiment of the present invention. The vehicle sunroof is shown slightly open, and the guide rails are illustrated schematically and exploded for clarity.

The guide rail system according to one embodiment of the present invention has at least one first guide rail for a first vehicular component and at least one second guide rail for a second vehicular component. The first and second guide rails may be made from two different materials and are connected with each other. The two guide rails are tailored to their unique load requirements by employing materials having different properties. Therefore, portions of the guide rail system, which previously were complicated to manufacture and had several guide tracks integrated in one piece, may be easily replaced.

Further, the individual guide rails can also be modified independently from one another. If, for instance, the geometry of the second guide rail has to be modified, it is not necessary to modify the entire guide rail system. Instead, it is sufficient to modify only the second guide rail to the new requirements.

The geometry of the connection interface between the two guide rails can be standardized. By standardizing the connecting geometries, the tool for connecting the guide rails can remain unchanged despite modification to the guide rails. Therefore, it would be very simple to build modular systems with different guide rails. In addition, by combining different standardized sections it is possible to adapt the guide rail system to fulfill differing needs in a quick and cost-effective manner. Moreover, the second guide rail can be used for an optional feature. For example, a basic version of a motor vehicle may be equipped only with a first guide rail, with a second guide rail being offered as an option on a higher line version.

In previous systems, the length of the individual guide rails has been determined by the longest guide track, requiring the guide rail to be machined locally in the area of the shorter guide track, to not require additional space. The present invention allows guide rails that differ in length to be combined with each other without this additional finishing operation. Further, as disclosed, the guide rails are connected by a positive fit and without requiring separate connectors.

This invention is particularly advantageous when the guide rails are curved, such as on vehicle roofs where the longitudinal guides for the moveable sunroof or sunshade systems are adapted to curved longitudinal spars of a roof frame of a dome-shaped roof. In fact, in many cases, the longitudinal spars of the roof frame are not only bowed as seen from the side of the vehicle, but also as seen from a top view of the vehicle. That is, the longitudinal spars are also often bowed between the front and rear ends.

In one embodiment, the first guide rail is an elongate body that is curved along its length and the second guide rail is configured as an elongate body that is provided with a differing curvature or no curvature at all. The second guide rail is bent elastically and fastened to the first guide rail, with pretension resulting from the differing curvatures. This means that the second guide rail does not have to be adapted to the vehicular contour at all. Instead, the desired curvature profile is forced on the second guide rail by fastening it to the curved first guide rail. Further, the second guide rail is always available as a modular part and can therefore be used as a standard component without additional adaptation.

In the connection employed in this embodiment, it is advantageous that the guide rails have protrusions that come into engagement with each other by relative motion in the longitudinal direction. The guide rails are then partially pushed into each other with an offset between them, achieving a positive along their entire length.

The protrusions can be, for example, integrally-formed legs that extend across the length of at least one guide rail.

The materials of the two guide rails can be completely different. In one embodiment, the first guide rail is made of metal and the second guide rail is made of plastic. The first guide rail is used to guide the cover of a sliding-tilting sunroof, for example, and therefore has to withstand higher mechanical loads than the second guide rail guiding, for example, a much lighter sunshade, such as a window blind arranged underneath the cover.

Finally, as previously mentioned, parallel pairs of one first and one second guide rail are preferably arranged at the sides of each vehicular component for optimum guidance.

Also, disclosed is a method of producing a guide rail system for a movable sunroof including the following steps:

producing a first guide rail from a first material;

producing a second guide rail from a second material that is different from the first material; and directly connecting the first guide rail and the second guide rail to each other with a positive fit, wherein an at least one protrusion of one of the first guide rail and the second guide rail engages the other guide rail.

Further, as previously mentioned, one guide rail is preferably bent, and in particular elastically bent, when being fastened to the other guide rail. It is advantageous if the guide rail with the higher flexural rigidity has the desired bend or curvature of the final guiding system so that the softer, unbent guide rail has to adapt to the bend or curvature of the stiffer guide rail.

The two guide rails, one being formed from metal and the other from plastic, are provided in the preferred embodiment. Further, at least one of the guide rails may be produced by extrusion. The process of bending the one guide rail for engagement to the other guide rail occurs when the two guide rails already rest against one another such that the guide rails are coupled with each other under pretension. Further, the force between the guide rails and hence the tension can be selectively reduced by aging under heat.

A further embodiment of the invention includes a provision that allows the two guide rails to be fastened to one another through positive fit connections, whereby at least one of the guide rails includes integrally-formed latching noses or legs capable of latching into recesses of the other guide rail.

Examples of the invention will now be described with respect to the figures:

FIG. 1 schematically illustrates a sliding-tilting sunroof that has a cover 1 adapted to be shifted in longitudinal direction and that forms a part of the roof outer skin. To open the roof and create a roof opening 3, the cover 1 can be moved to a position located underneath a fixed roof skin 2.

Figure 2:
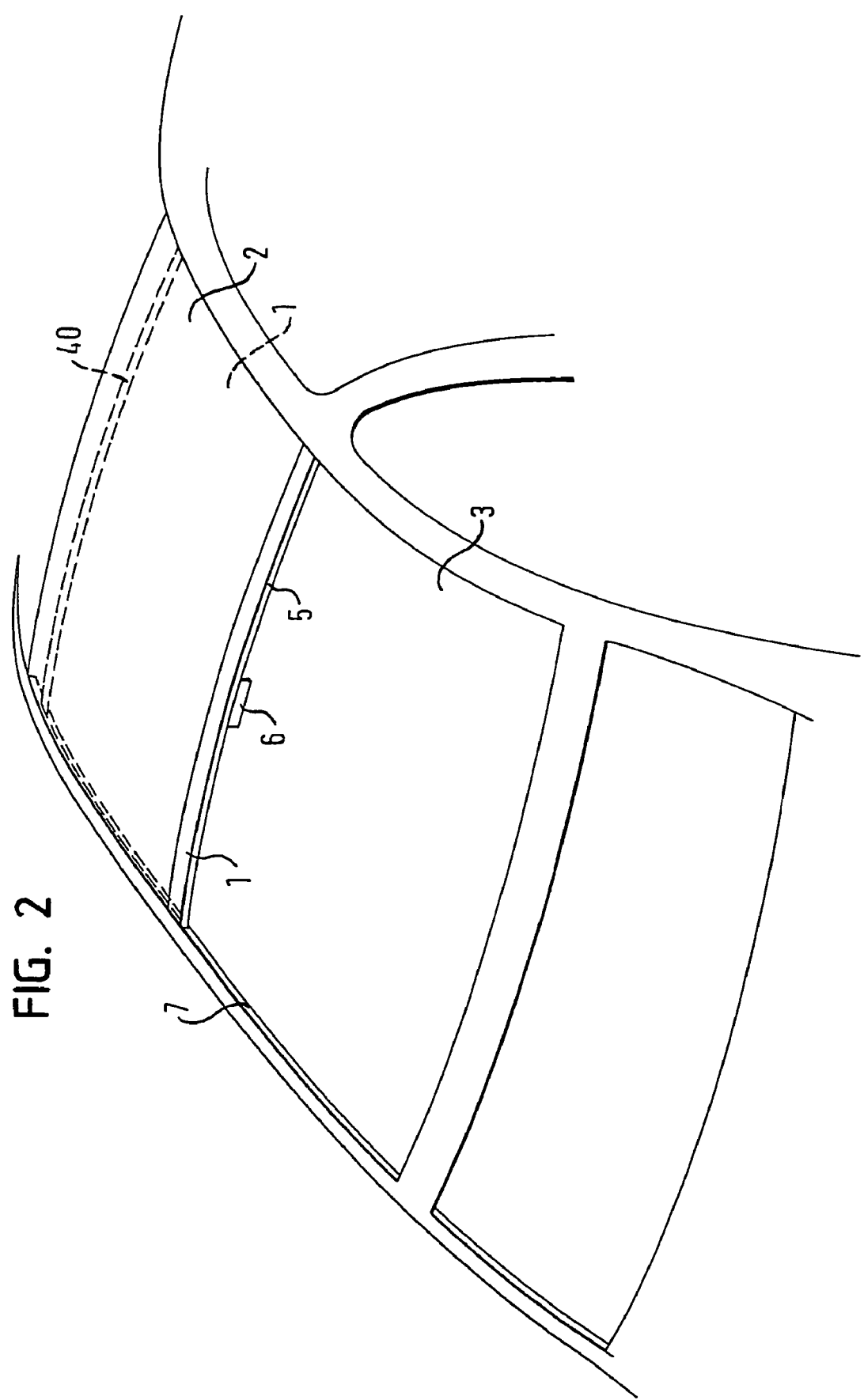
FIG. 2 is a schematic top view of the vehicle sunroof of FIG. 1 in a fully opened state.

FIG. 2 schematically illustrates the roof opening 3 created when the sliding-tilting roof is fully opened. The cover 1 and the fixed roof skin 2 may be made of glass and form a so-called panoramic window. A variable sunshade, like a window blind 4 (see FIG. 1), is provided underneath at least the cover 1 and, preferably also underneath the fixed roof skin 2 when the fixed roof skin 2 is made of glass. The window blind 4 is usually made of a textile material that is fastened to a front vehicular header 5 that is movable by a handle 6.

Both the cover 1 and the window blind 4 are supported on the left and right sides in associated guide rails so as to be able to travel in longitudinal direction. The left and the right guide rails are combined respectively into a left and a right guiding system 7.

Figure 3:
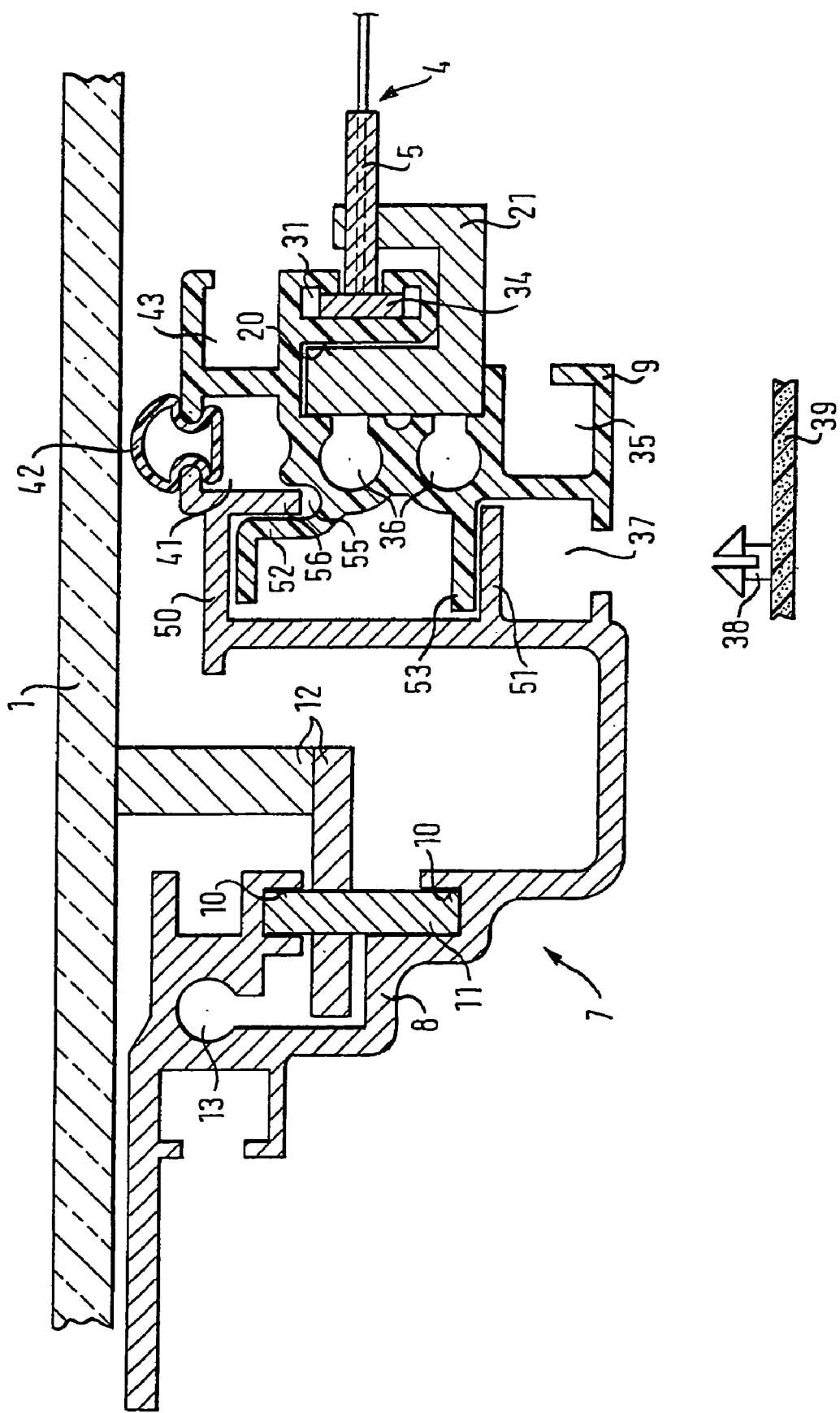
FIG. 3 is a cross-sectional view through a right-hand side edge of a sliding-tilting sunroof as viewed in the direction of travel. The Figure also shows a right-hand guide rail system according to one embodiment of the present invention and shown without a longitudinal spar of the vehicle.

One embodiment of the guiding system 7 is illustrated in FIG. 3, which shows a right-hand guiding system as viewed in the direction of travel. The left-hand guiding system would be a mirror image. The guiding system 7 has a first guide rail 8 made of an extruded aluminum section and a second guide rail 9 made of a plastic material and that is likewise produced by extrusion. The first guide rail 8 has a guide track 10. Projecting into the guide track 10 is a sliding block 11 that is connected to the cover 1. The connecting parts 12 are illustrated only schematically and are not to be interpreted as limiting. The first guide rail 8 further has a cable duct 13 that has a substantially circular cross-section. A drive cable (not shown) provided for driving the sliding block 11, is guided within the cable duct 13 such that it is resistant to bending. Preferably, at least two sliding blocks 11 are provided and arranged at the ends of the cover 1 to ensure stable guidance of the cover. The cover 1 may be thought of as a first movable vehicular component.

The second guide rail 9 supports and guides the lightweight window blind 4 (i.e., a second movable vehicular component). As such, the second guide rail 9 is produced from a plastic material having a lower flexural rigidity. The second guide rail 9 has a guide track 20. For translational motion, a slider 21 for the front vehicular header 5 is mounted transversely in the guide track 20. Further formed in the second guide rail 9 is a C-shaped guide channel 31 that provides lateral guidance for the textile portion of the window blind 4. A flexible slide section or several slide blocks are attached to the side of the textile edge of the window blind 4 by injection-molding.

In addition, the second guide rail 9 has several channel-shaped recesses for various purposes. An accommodation space 35 receives drive elements or covering elements. Cable ducts 36 receive cables for the transmission of drive power, signals and/or energy. Clips 38 for fastening an interior roof lining 39 penetrate into a channel 37. Additionally, a window blind cartridge 40 (FIG. 2) with an automatic rewinder included can be fixed in the channel 37. An acoustic insert seal 42 is fixed in a channel 41 and a wind deflector (not shown) is fixed in a channel 43.

Further, the channel 41 is limited in portions by the two guide rails 8, 9. Guide rails 8 and 9 are directly connected with each other with a positive fit by protrusions, which engage and are in contact with one another under pretension and across a large surface area. The connection is effected by a positive geometry that may be standardized, allowing the guide rails 8, 9 to have different designs independent of this geometry and creating a modular system through which different guide rails 8, 9 can be combined with each other. The guide rails 8, 9, when viewed in cross-section, have protrusions in the shape of legs 50, 51 and 52, 53, respectively. The legs 52, 53 of the second guide rail 9 are located in a first accommodation space of the first guide rail 8, with the accommodation space being defined by the legs 50, 51. Leg 52 lies at the inner side of leg 50 and leg 53 lies at the inner side of leg 51. The second guide rail 9 further has a recess in the shape of an undercut 55 into which protrudes a free edge 56 of leg 50.

As previously illustrated in FIG. 1, the first guide rail 8 or 108 is adapted to the extension of the corresponding longitudinal spar 122 of the roof frame, i.e. the first guide rail 8 has a curvature according to which it runs downwards and outwards to its longitudinal ends. In comparison, the second guide rail 9 or 109, when not installed, does not have any curvature transverse to the longitudinal direction. Both the first and second guide rails 8, 108 and 9, 109 constitute elongate bodies.

Prior to installation, the guide rails 8, 9 are connected with each other. The second guide rail 9 includes the legs 52, 53, which are longitudinally pushed through an open end face of the first guide rail 8 into a space which is defined by the legs 50, 51. During this longitudinal movement of the guide rails 8, 9, the curvature of the first guide rail 8 is imposed on the second guide rail 9. Thus, when installed the guide rails rest against one another under pretension transverse to the longitudinal direction. In this arrangement, the second guide rail 9 has a somewhat smaller length than the first guide rail 8 and, in the area where the guide rails 8, 9 engage each other, the positive connection is provided across the entire length. The second guide rail 9 is elastically bent during insertion in the first guide rail 8; with an extreme curvature. A plastic bending would also be possible, of course.

In order to immobilize the final relative position in the longitudinal direction, the guide rails 8, 9 can be fixed by fastening means (e.g. bolts, screws, glue, etc.) to each other and/or to the roof spar.

In addition, desirable creeping and a reduction of tension occurs between the guide rails 8, 9.

The embodiment according to FIG. 4 likewise has a first guide rail 108 made of extruded aluminum and a second guide rail 109 made of extruded plastic, both of which are directly and positively connected with one another. In addition, portions that have been previously explained in the context of FIG. 3 are also included here. Because these portions have the same function, they are designated with the already introduced reference numbers increased by 100. The primary difference between these two embodiments is that the two guide rails 108, 109 are positively connected with one another by means of a latching connection. To this end, laterally projecting protrusions in the shape of latching noses 160 are formed on the first guide rail 108, which latch in place in slot-shaped recesses 161 having an undercut. In the latched state, the guide rails 108, 109 rest against one another under pretension, because in this embodiment the second guide rail 109 in the un-mounted state has no curvature transverse to the longitudinal direction and will be elastically bent during assembly, to adapt to the extension of the first guide rail 108. Also in this embodiment, heat treating or aging is possible. 39 As an alternative, the second guide rail 109 in this embodiment can also be slipped on the latching noses 160 by a longitudinal shifting and instead of the latching noses 160, a leg with a similar cross-section can be formed on the first guide rail 108.

Although preferred embodiments of this invention have been disclosed, a worker of ordinary skill in this art would recognize that certain modifications would come within the scope of this invention. For that reason, the following claims should be studied to determine the true scope and content of this invention.

We claim:

1. A guiding system for movable vehicular components, comprising:

at least one first guide rail for a first vehicular component; and at least one second guide rail for a second vehicular component, wherein said at least one first guide rail and said at least one second guide rail each comprise a single piece component that extends in a longitudinal direction, and wherein said at least one first guide rail and said at least one second guide rail have sections immediately engaging each other to connect said at least one first guide rail and said at least one second guide rail with each other in a form-fitting manner in a horizontal and a vertical direction as viewed in the longitudinal direction, said form-fitting manner comprising an interfit between at least one recess formed in one of said first and second guide rails and at least a portion of the other of said first and second guide rails.

2. The guiding system according to claim 1, wherein said at least one first guide rail and said at least one second guide rail are directly connected to each other.

3. A guiding system for movable vehicular components, comprising:

at least one first guide rail for a first vehicular component; and at least one second guide rail for a second vehicular component, wherein said at least one first guide rail and said at least one second guide rail extend in a longitudinal direction and have sections immediately engaging each other to connect said at least one first guide rail and said at least one second guide rail with each other in a form-fitting manner in a horizontal and a vertical direction as viewed in the longitudinal direction, and wherein said sections comprise at least a first section formed in said at least one first guide rail and a second section formed in said at least one second guide rail, wherein said first section engages said second section such that said at least one first and said at least one second guide rails are held fixed relative to each other in the horizontal direction and the vertical direction without requiring any type of additional attachment between said first and second sections.

4. The guiding system according to claim 3, wherein said first and said second sections are provided on an entire length along which said at least one first guide rail and said at least one second guide rail are connected to each other.

5. A guiding system for movable vehicular components, comprising:

at least one first guide rail for a first vehicular component; and at least one second guide rail for a second vehicular component, wherein said at least one first guide rail and said at least one second guide rail are connected to each other and wherein said at least one first guide rail is an elongate body defining a first transverse curvature and said at least one second guide rail is an elongate body defining a second transverse curvature, wherein the first transverse curvature is different than the second transverse curvature, and said at least one second guide rail is bent and fastened with a pretension to said at least one first guide rail, wherein the pretension is created by the differing transverse curvatures of said at least one first guide rail and said at least one second guide rail.

6. The guiding system according to claim 1, wherein said at least one first guide rail and said at least one second guide rail each include at least one protrusion, wherein the protrusions on said at least one first guide rail and said at least one second guide rail engage each other by a relative motion in the longitudinal direction.

7. The guiding system according to claim 1, wherein said at least one first guide rail and said at least one second guide rail each include at least one protrusion, wherein the protrusion extends across a length of said at least one of said first guide rail and second guide rail, and wherein the protrusion in the first guide rail engages the protrusion in the second guide rail.

8. The guiding system according to claim 1 wherein said at least one first guide rail is made of a first material and said at least one second guide rail is made of a second material.

9. The guiding system according to claim 8, wherein the first material and the second material have differing rigidities.

10. The guiding system according to claim 1, wherein said at least one first guide rail has a first flexural rigidity that is larger than a second flexural rigidity of said at least one second guide rail and wherein said at least one first guide rail has a greater curvature than a curvature of said at least one second guide rail.

11. The guiding system according to claim 1, wherein said at least one first guide rail is made of metal and said at least one second guide rail is made of plastic.

12. The guiding system according to claim 1, wherein said at least one first guide rail has a first length and said at least one second guide rail has a second length that is different from the first length.

13. The guiding system according to claim 1, wherein the first vehicular component is a cover of a sliding-tilting sunroof.

14. The guiding system according to claim 1, wherein the second vehicular component is a sunshade system.

15. The guiding system according to claim 1, wherein the second vehicular component is a sunshade.

16. The guiding system according to claim 1, wherein the second vehicular component is a window blind.

17. The guiding system according to claim 1, wherein parallel pairs of said at least one first guide rail and said at least one second guide rail are arranged at the sides of each of said first and second vehicular components.

18. A method of producing a guiding system for movable vehicular components comprising the steps of:
producing a first guide rail from a first material;
producing a second guide rail from a second material that is different from the first material wherein the first and second guide rails each comprise a single piece component; and
directly connecting the first guide rail and the second guide rail with each other in a form-fitting manner in a horizontal and a vertical direction as viewed in a longitudinal direction defined by the first and second guide rails, wherein at least one protrusion is formed on one of the first guide rail and the second guide rail and engages in at least one recess in the other of the first guide rail and the second guide rail.

19. A method of producing a guiding system for movable vehicular components comprising the steps of:
producing a first guide rail from a first material;
producing a second guide rail from a second material that is different from the first material; and
directly connecting the first guide rail and the second guide rail with each other in a form-fitting manner in a horizontal and a vertical direction as viewed in a longitudinal direction defined by the first and second guide rails, wherein at least one protrusion is formed on one of the first guide rail and the second guide rail and engages the other of the first guide rail and the second guide rail and wherein the first guide rail and the second guide rail are produced as elongate bodies where the first guide rail runs with a transverse curvature along the longitudinal direction, and the second guide rail runs with a different curvature transverse to the longitudinal direction of the first guide rail, and further comprising bending the second guide rail during connection to the first guide rail, the second guide rail held in a bent condition by the first guide rail.

20. The method according to claim 18, wherein the first material has a higher flexural rigidity than the second material.

21. The method according to claim 18, further comprising the step of connecting the first guide rail to the second guide rail by relative longitudinal movement.

22. A method of producing a guiding system for movable vehicular components comprising the steps of:
producing a first guide rail from a first material;
producing a second guide rail from a second material that is different from the first material; and
directly connecting the first guide rail and the second guide rail with each other by relative longitudinal movement in a form-fitting manner in a horizontal and a vertical direction as viewed in a longitudinal direction defined by the first and second guide rails, wherein at least one protrusion is formed on one of the first guide rail and the second guide rail and engages the other of the first guide rail and the second guide rail wherein the engaging step further comprises bending the second guide rail.

23. The method according to claim 18, wherein the first guide rail and second guide rail include overlapping lengths and wherein the method further comprises the step of fastening the first guide rail and the second guide rail to each other such that the overlapping lengths engage each other in a form-fitting manner.

24. The method according to claim 18, wherein the step of producing a first guide rail comprises producing the first guide rail from a metal material.

25. The method according to claim 18, wherein the step of producing a second guide rail comprises producing the second guide rail from a plastic material.

26. The method according to claim 18, wherein the steps of producing the first guide rail and the second guide rail comprises producing at least one of the first guide rail and second guide rail by extrusion.

27. The method according to claim 18, further comprises the step of aging the connected guide rails under heat.

28. A method of producing a guiding system for movable vehicular components comprising the steps of:
producing a first guide rail from a first material;
producing a second guide rail from a second material that is different from the first material; and
directly connecting the first guide rail and the second guide rail with each other in a form-fitting manner in a horizontal and a vertical direction as viewed in a longitudinal direction defined by the first and second guide rails, wherein at least one protrusion is formed on one of the first guide rail and the second guide rail and engages the other of the first guide rail and the second guide rail and wherein the first and second guide rails are immediately pretensioned relative to each other by the connecting step.

29. A guiding system for movable vehicular components, comprising:
at least one first guide rail for a first vehicular component; and
at least one second guide rail for a second vehicular component, wherein said at least one first guide rail and said at least one second guide rail extend in a longitudinal direction and have sections immediately engaging each other to connect said at least one first guide rail and said at least one second guide rail with each other in a form-fitting manner in a horizontal and a vertical direction as viewed in the longitudinal direction wherein one of said at least one first guide rail and said at least one second guide rail includes at least one recess and the other of said at least one first guide rail and said at least one second guide rail includes at least one protrusion, and wherein said at least one first guide rail and said at least one second guide rail are connected to each other by inserting said at least one protrusion into said at least one recess such that said at least one first and second guide rails rest against each other under pretension transverse to the longitudinal direction.

30. The guiding system according to claim 1 wherein one of said at least one first guide rail and said at least one second guide is bendable from a pre-installation position to an installation position to conform to a curvature defined by the other of said at least one first guide rail and said at least one second guide rail.

31. The method according to claim 18 including the steps of forming the at least one recess in one of the first and second guide rails, forming the at least one protrusion on the other of the first and second guide rails, and connecting the first and second guide rails to each other by inserting the at least one protrusion into the at least one recess such that the first and second guide rails are directly connected to each other due to pretension provided by a curvature of at least one of the first and second guide rails and the form-fitting manner.

* * * * *